US011674457B2

(12) United States Patent
Azuma et al.

(10) Patent No.: US 11,674,457 B2
(45) Date of Patent: Jun. 13, 2023

(54) INTAKE DEVICE

(71) Applicant: AISAN KOGYO KABUSHIKI KAISHA, Obu (JP)

(72) Inventors: Kazuya Azuma, Tokai (JP); Kazuo Nakamura, Takahama (JP)

(73) Assignee: AISAN KOGYO KABUSHIKI KAISHA, Obu (JP)

(*) Notice: Subject to any disclaimer, the term of this patent is extended or adjusted under 35 U.S.C. 154(b) by 0 days.

(21) Appl. No.: 17/414,572

(22) PCT Filed: Sep. 3, 2019

(86) PCT No.: PCT/JP2019/034633
§ 371 (c)(1),
(2) Date: Jun. 16, 2021

(87) PCT Pub. No.: WO2020/137008
PCT Pub. Date: Jul. 2, 2020

(65) Prior Publication Data
US 2022/0056855 A1 Feb. 24, 2022

(30) Foreign Application Priority Data
Dec. 26, 2018 (JP) .............................. JP2018-243285

(51) Int. Cl.
F02D 9/10 (2006.01)
F02D 9/08 (2006.01)
F02M 35/10 (2006.01)

(52) U.S. Cl.
CPC ............... F02D 9/108 (2013.01); F02D 9/08 (2013.01); F02M 35/10255 (2013.01); F02M 35/10321 (2013.01)

(58) Field of Classification Search
CPC ..... F02D 9/108; F02D 9/08; F02M 35/10255; F02M 35/10321
See application file for complete search history.

(56) References Cited

U.S. PATENT DOCUMENTS 5,669,350 A * 9/1997 Altmann ................... F02D 9/10
425/588
6,000,377 A * 12/1999 Sato ........................ F02D 11/10
29/890.12

(Continued)

FOREIGN PATENT DOCUMENTS

EP 2184468 A1 5/2010
JP H10-103089 A 4/1998

(Continued)

OTHER PUBLICATIONS

International Search Report (ISR) for PCT/JP2019/034633 dated Nov. 19, 2019 (3 pages including English translation).

(Continued)

Primary Examiner — Lindsay M Low
Assistant Examiner — Susan E Scharpf
(74) Attorney, Agent, or Firm — Shumaker, Loop & Kendrick, LLP

(57) ABSTRACT

An intake duct that includes a first flange projecting outward from an edge of the intake duct on a throttle body side. An intake manifold that includes a second flange projecting outward from an edge of the intake manifold on a throttle body side. A plurality of spacers is provided between the first flange and the second flange around the throttle body. The first flange and the second flange are fastened via the plurality of spacers in a state where the throttle body is held between the intake duct and the intake manifold.

13 Claims, 9 Drawing Sheets

(56) References Cited

U.S. PATENT DOCUMENTS

| | | | | |
|---|---|---|---|---|
| 6,209,501 | B1* | 4/2001 | Kaneko | F02B 31/085 123/184.21 |
| 6,269,805 | B1* | 8/2001 | Wilson | F02M 35/10301 123/585 |
| 6,352,241 | B1* | 3/2002 | Hannewald | F02D 9/104 251/305 |
| 6,484,749 | B1* | 11/2002 | Lim | F16L 23/006 277/939 |
| 6,694,940 | B2* | 2/2004 | Kawai | F02M 35/04 123/184.21 |
| 6,973,917 | B2* | 12/2005 | Shimada | F02D 11/10 123/399 |
| 8,453,617 | B1* | 6/2013 | Olson | F02M 35/10019 123/359 |
| 10,662,916 | B2* | 5/2020 | Laws | F02D 35/0092 |
| D910,716 | S* | 2/2021 | Bink | F16K 1/222 D15/5 |
| D927,551 | S* | 8/2021 | Hudnall | F02M 35/10262 D8/382 |
| 2002/0104501 | A1 | 8/2002 | Kawai | F02D 9/1035 123/184.21 |
| 2002/0171059 | A1* | 11/2002 | Sakurai | F16K 31/043 251/305 |
| 2003/0024576 | A1* | 2/2003 | Schaefer | F02D 9/1065 137/554 |
| 2003/0154951 | A1* | 8/2003 | Nakamura | F02M 35/024 123/198 E |
| 2004/0040538 | A1* | 3/2004 | Shimada | F02D 11/10 251/305 |
| 2004/0187920 | A1* | 9/2004 | Schmidt | F16K 1/222 251/305 |
| 2005/0028777 | A1* | 2/2005 | Yang | F02M 35/112 123/184.21 |
| 2006/0042469 | A1* | 3/2006 | Richards | F02M 35/021 96/422 |
| 2007/0017492 | A1* | 1/2007 | Baasch | F02M 25/00 123/585 |
| 2008/0135009 | A1* | 6/2008 | Wilson | F02M 35/10262 123/590 |
| 2013/0180507 | A1* | 7/2013 | Nakasugi | F02B 29/0437 123/542 |
| 2016/0061166 | A1* | 3/2016 | Tanaka | F02M 35/10222 123/184.21 |
| 2017/0362995 | A1* | 12/2017 | Saindon | F02M 35/10157 |
| 2018/0238280 | A1* | 8/2018 | Suematsu | F02M 37/007 |

FOREIGN PATENT DOCUMENTS

| | | |
|---|---|---|
| JP | 2002-235617 A | 8/2002 |
| JP | 2010-116794 A | 5/2010 |
| JP | 2013-060844 A | 4/2013 |
| JP | 2018-132033 A | 3/2018 |
| KR | 10-2016-0070934 A | 6/2016 |

OTHER PUBLICATIONS

Written Opinion (WO) (English translation) for PCT/JP2019/034633 dated Nov. 19, 2019 (4 pages).
Office Action (OA) for Indian Pat. App. 202117031151 dated Feb. 24, 2022 (5 pages).

* cited by examiner

INTAKE DEVICE

CROSS-REFERENCE TO RELATED APPLICATION

This application claims priority to Japanese patent application No. 2018-243285, filed on Dec. 26, 2018, the entire contents of which are incorporated herein by reference.

TECHNICAL FIELD

The art disclosed herein relates to an intake device.

BACKGROUND ART

Patent Document 1 (Japanese Patent Application Publication No. 2002-235617) describes an intake device. The intake device of Patent Document 1 includes a throttle body including a throttle valve, an air cleaner casing disposed on one side of the throttle body, and an intake manifold disposed on the other side of the throttle body. In the intake device of Patent Document 1, a flange of the throttle body is directly held by and detachably fixed to the air cleaner casing and the intake manifold.

SUMMARY OF INVENTION

Technical Problem

In the intake device of Patent Document 1, there has been a case in which fastening force does not act uniformly over an entirety of the throttle body when the flange of the throttle body is firmly tightened by the air cleaner casing and the intake manifold in the state where the throttle body is held between the air cleaner casing and the intake manifold. Due to this, the throttle body distorted in such a case. For example, there has been a case in which force is applied to a bore unit upon assembling the air cleaner casing and the intake manifold onto the throttle body, resulting in distortion of these members. In view of this, the disclosure herein provides art for preventing distortion of a throttle body.

Solution to Technical Problem

An intake device disclosed herein may comprise: a throttle body comprising a throttle valve; an intake duct disposed on one side of the throttle body; and an intake manifold disposed on the other side of the throttle body. The intake duct may comprise a first flange projecting outward from an edge of the intake duct on the throttle body side. The intake manifold may comprise a second flange projecting outward from an edge of the intake manifold on the throttle body side. A plurality of spacers may be provided between the first flange and the second flange around the throttle body. The first flange and the second flange may be fastened via the plurality of spacers in a state where the throttle body is held between the intake duct and the intake manifold.

According to this configuration, fastening force generated by this fastening being locally applied to the throttle body held between the intake duct and the intake manifold can be mitigated by virtue of having the plurality of spacers in between the intake duct and the intake manifold. The fastening force can uniformly be applied to an entirety of the throttle body. Further, since the throttle body does not have a fastened portion, even when flatness of a surface of the intake manifold on the throttle body side is low, for example, this low flatness does not directly affect the throttle body. Due to this, distortion of the throttle body can be mitigated.

A gasket may be disposed between the intake duct and the throttle body. According to this configuration, airtightness between the intake duct and the throttle body can be increased, and both entry of external air into an intake passage on an upstream side (on an intake duct side) of the throttle body and exit of air from the intake passage can be reduced.

The throttle body may be constituted of resin. When the throttle body is constituted of resin, the throttle body may easily distort, however, such distortion of the throttle body can be mitigated by presence of the plurality of spacers. Further, since the throttle body does not have a fastened portion, even when the flatness of the surface of the intake manifold on the throttle body side is low, for example, this low flatness does not directly affect the throttle body.

A hollow portion may be provided in the throttle body. At least one of the plurality of spacers may be located in the hollow portion. According to this configuration, weight of the throttle body can be reduced. Further, for example, the hollow portion may be defined between a motor unit and a bore unit of the throttle body, and the spacers may be disposed within the hollow portion. According to this configuration, the intake duct and the intake manifold can be fastened near the center of gravity of the throttle body, and durability of the throttle body can be improved.

DETAILED DESCRIPTION

Figure 1:
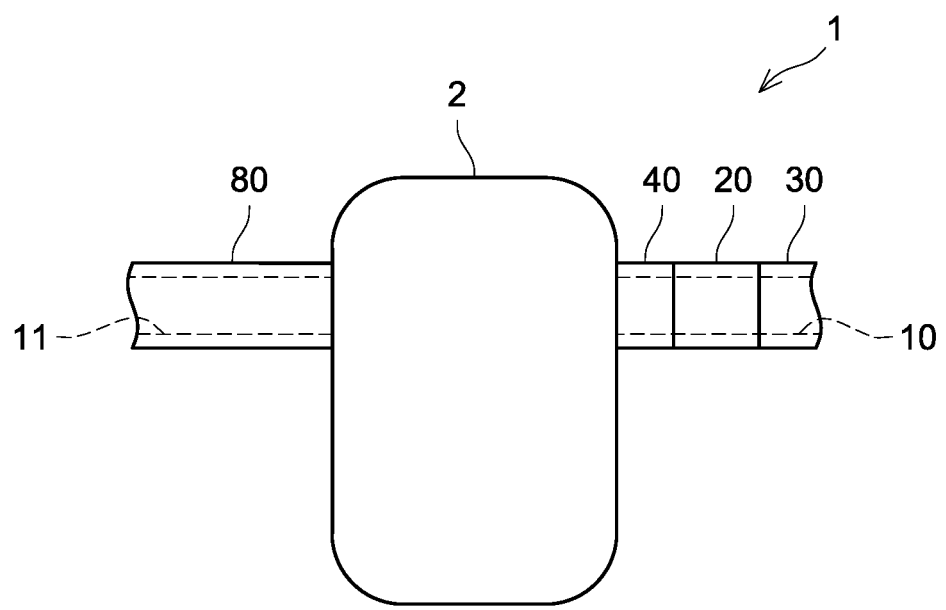
FIG. 1 schematically shows an intake device of an embodiment.

An intake device of an embodiment will be described with reference to the drawings. As shown in FIG. 1, an intake device 1 of the embodiment is connected to an engine 2. The engine 2 is a gasoline engine mounted in an automobile, for example. The intake device 1 includes an intake duct 30, a throttle body 20, and an intake manifold 40. The throttle body 20 is disposed between the intake duct 30 and the intake manifold 40. The intake manifold 40 is connected to the engine 2. An intake passage 10 is configured by the intake duct 30, the throttle body 20, and the intake manifold 40 being connected. The intake duct 30, the throttle body 20, and the intake manifold 40 are disposed in this order from an upstream side of the intake passage 10 to a downstream side thereof. Air to be inducted into the engine 2 flows in the intake passage 10. An exhaust duct 80 is also connected to the engine 2. The exhaust duct 80 configures an exhaust passage 11 through which gas discharged from the engine 2 flows.

As shown in FIGS. 2 to 5, the intake duct 30 of the intake device 1 includes a duct unit 31, a first annular flange 39 (an example of first flange), and a plurality of first projecting flanges 32 (an example of first flange). The intake duct 30 is constituted of resin or metal, for example. The duct unit 31 of the intake duct 30 constitutes a part of the intake passage 10. The air to be inducted in to the engine 2 flows in the duct unit 31. The duct unit 31 has a substantially pipe shape, and extends in a longitudinal direction of the intake passage 10. In the drawings, only a part of the duct unit 31 is depicted.

The first annular flange 39 of the intake duct 30 is fixed to an outer circumference of the duct unit 31. The first annular flange 39 extends along a circumferential direction of the duct unit 31. The first annular flange 39 projects out in directions perpendicular to the longitudinal direction of the intake passage 10. The first annular flange 39 projects outward from the duct unit 31.

The plurality of first projecting flanges 32 of the intake duct 30 is fixed to an outer circumference of the first annular flange 39. The plurality of first projecting flanges 32 is arranged in a spaced fashion along a circumferential direction of the first annular flange 39. Each of the first projecting flanges 32 projects outward in a direction perpendicular to the longitudinal direction of the intake passage 10. Each of the first projecting flanges 32 projects outward from the first annular flange 39. The plurality of first projecting flanges 32 and the first annular flange 39 are provided on an edge of the intake duct 30 on a throttle body 20 side in the longitudinal direction of the intake passage 10.

A spacer 50 is fixed to each of the plurality of first projecting flanges 32. Each of the spacers 50 is configured integrally with its corresponding one of the first projecting flanges 32. Each of the spacers 50 is constituted of resin or metal, for example. Each of the spacers 50 is fixed to an end of its corresponding first projecting flange 32 on a throttle body 20 side. Each of the spacers 50 has a substantially cylindrical shape and extends along the longitudinal direction of the intake passage 10. An end surface 55 of each of the spacers 50 in the longitudinal direction of the intake passage 10 abuts one of second projecting flanges 42 of the intake manifold 40 to be described later.

An insertion hole 33 is defined in each of the plurality of first projecting flanges 32 and each of the plurality of spacers 50. Each of the insertion holes 33 has a sleeve 53 inserted therein. The insertion holes 33 and the sleeves 53 may be configured integrally by insert molding. Each of the sleeves 53 may for example be constituted of metal. Each of the sleeves 53 has a substantially cylindrical shape and extends along the longitudinal direction of the intake passage 10. A bolt 60 is inserted into each of the sleeves 53.

Figure 6:
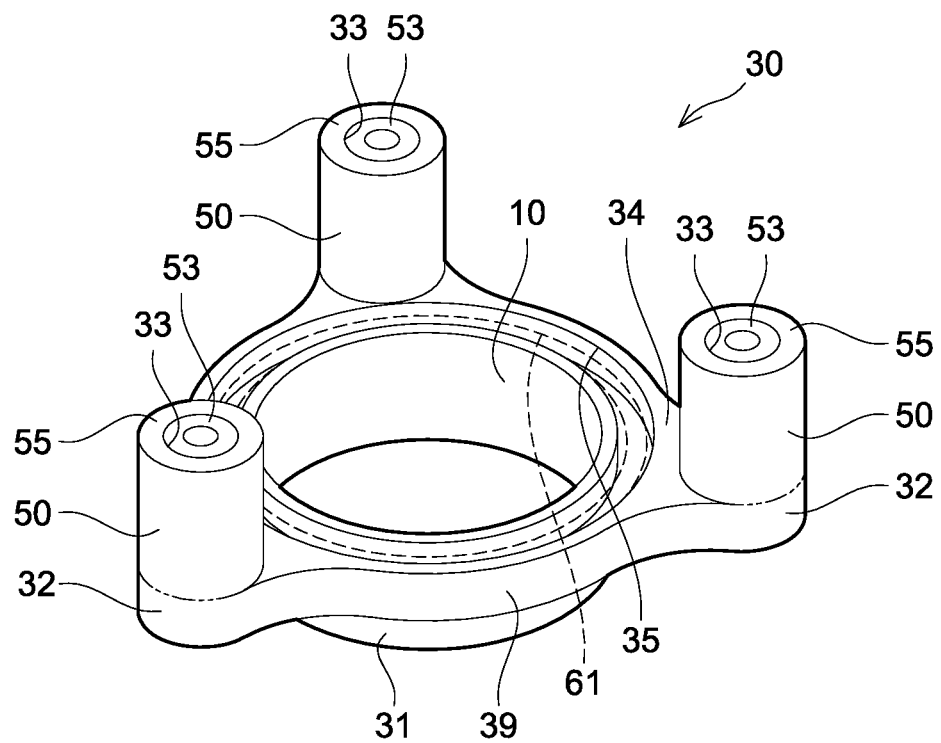
FIG. 6 is a perspective view of the intake duct of the embodiment as seen from the throttle body side.

As shown in FIG. 6, a groove 35 is defined in an end surface 34 of the intake duct 30 on the throttle body 20 side. The groove 35 is configured in an annular shape. The groove 35 is defined around the duct unit 31. An annular first gasket 61 is inserted in the groove 35 (in FIG. 6, the first gasket 61 is shown by broken lines). The first gasket 61 is disposed between the intake duct 30 and the throttle body 20.

Figure 2:
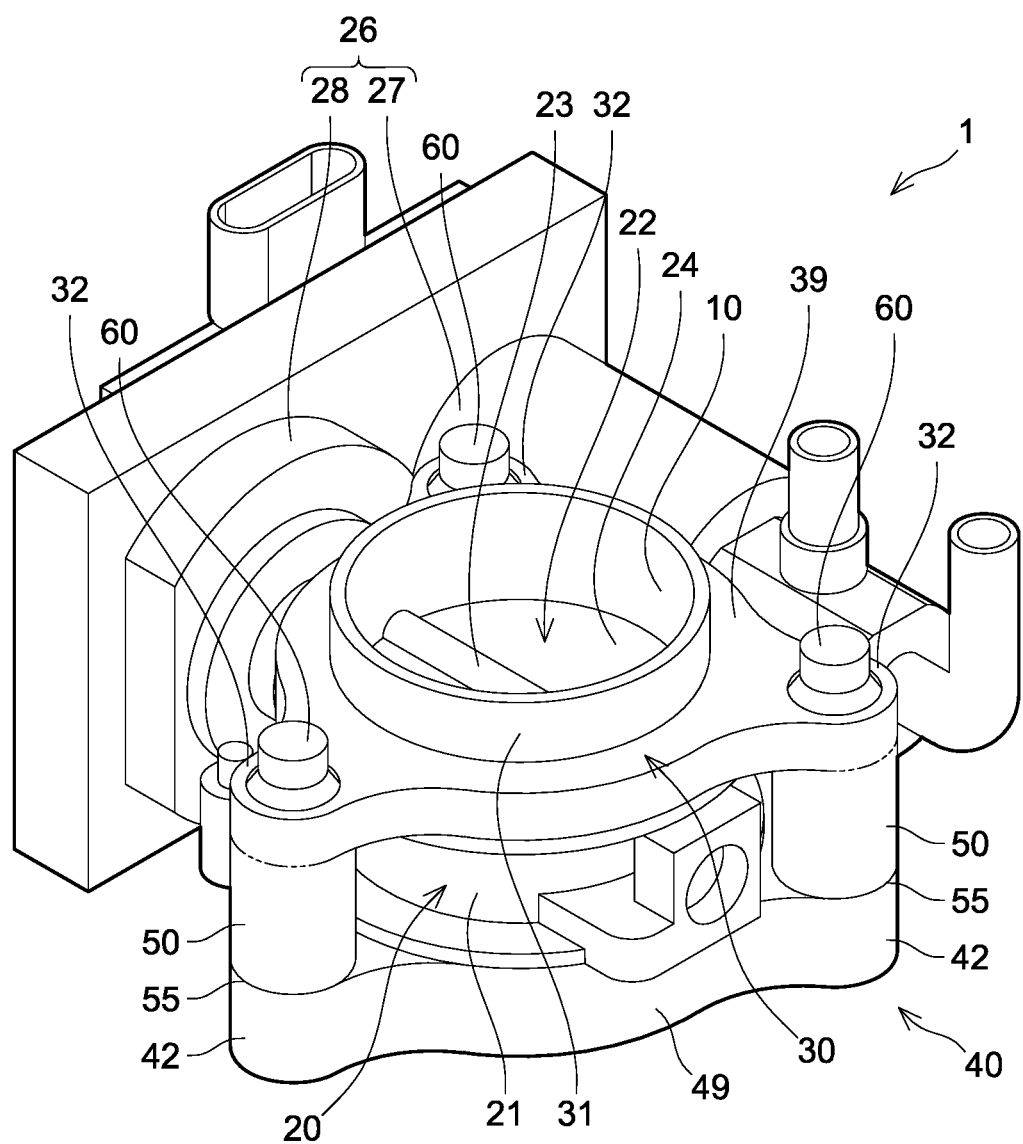
FIG. 2 is a perspective view of the intake device of the embodiment as seen from an intake duct side.
Figure 3:
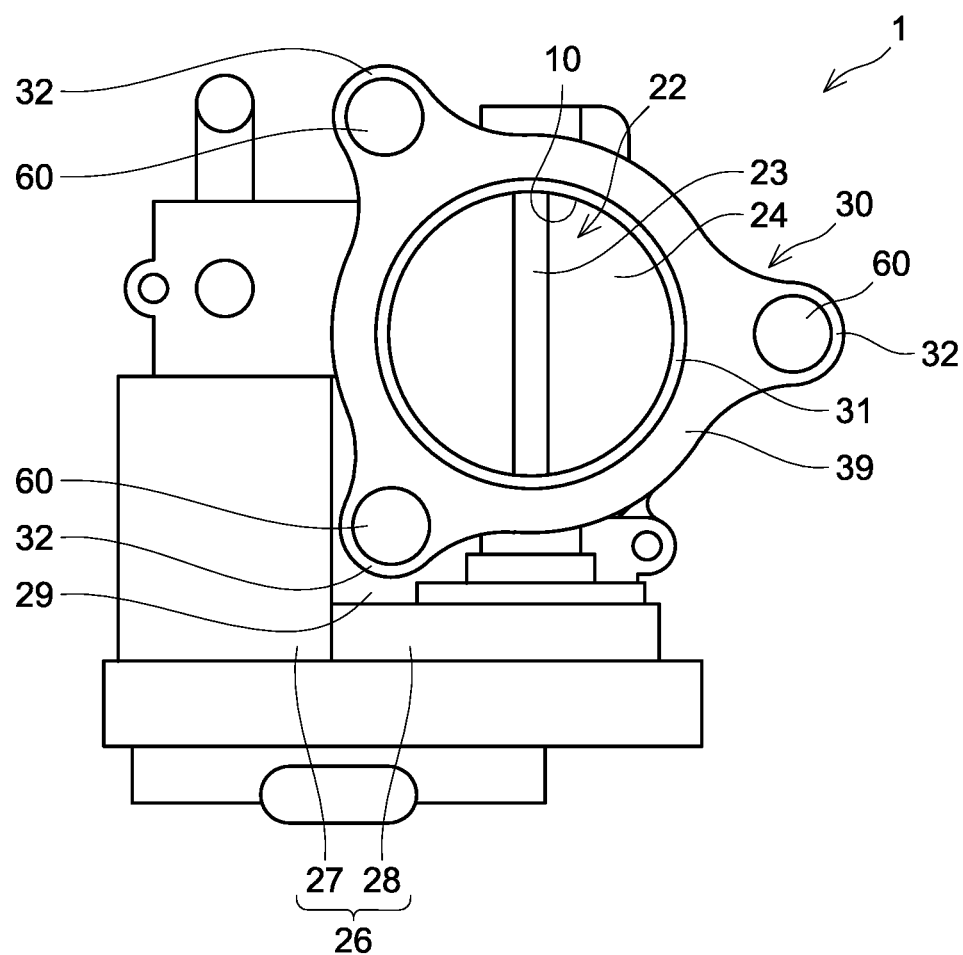
FIG. 3 is a plan view of the intake device of the embodiment as seen from the intake duct side.
Figure 4:
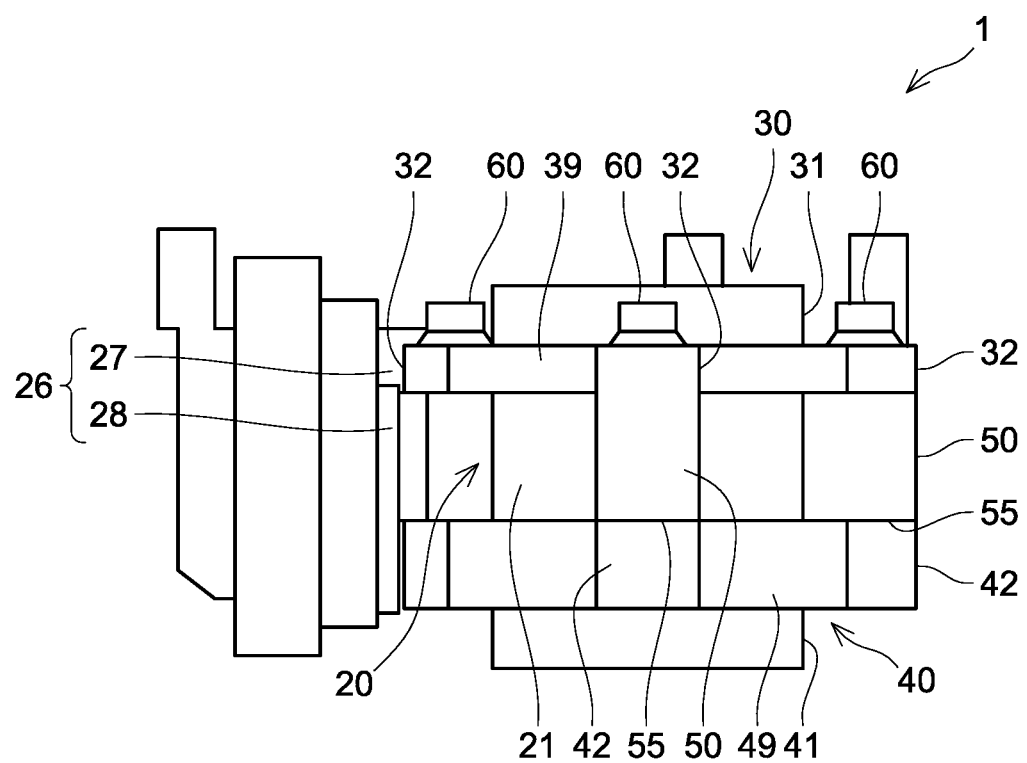
FIG. 4 is a side view of the intake device of the embodiment.
Figure 5:
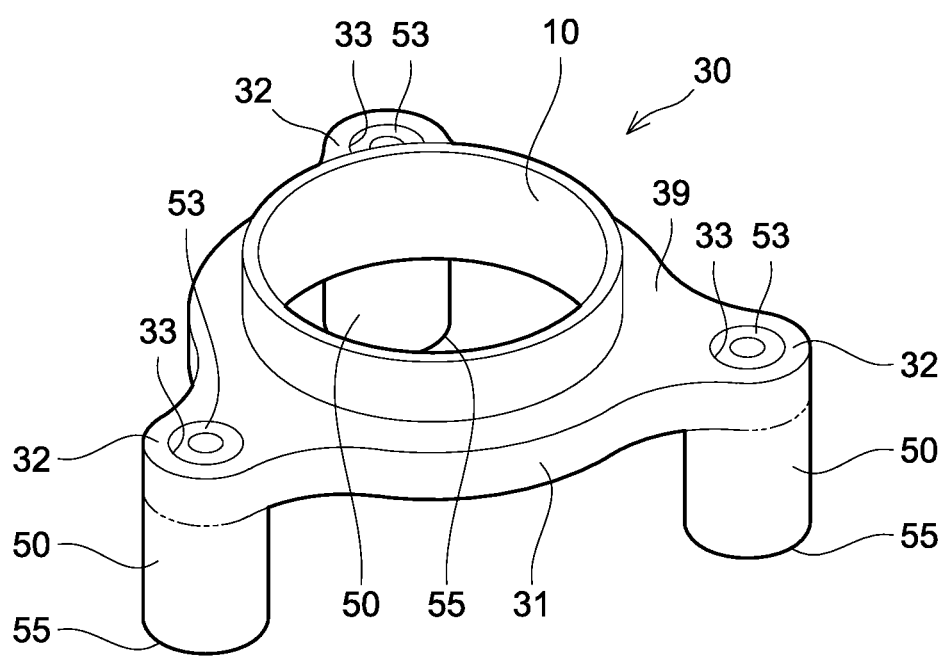
FIG. 5 is a perspective view of an intake duct of the embodiment as seen from an opposite side of a throttle body side.
Figure 7:
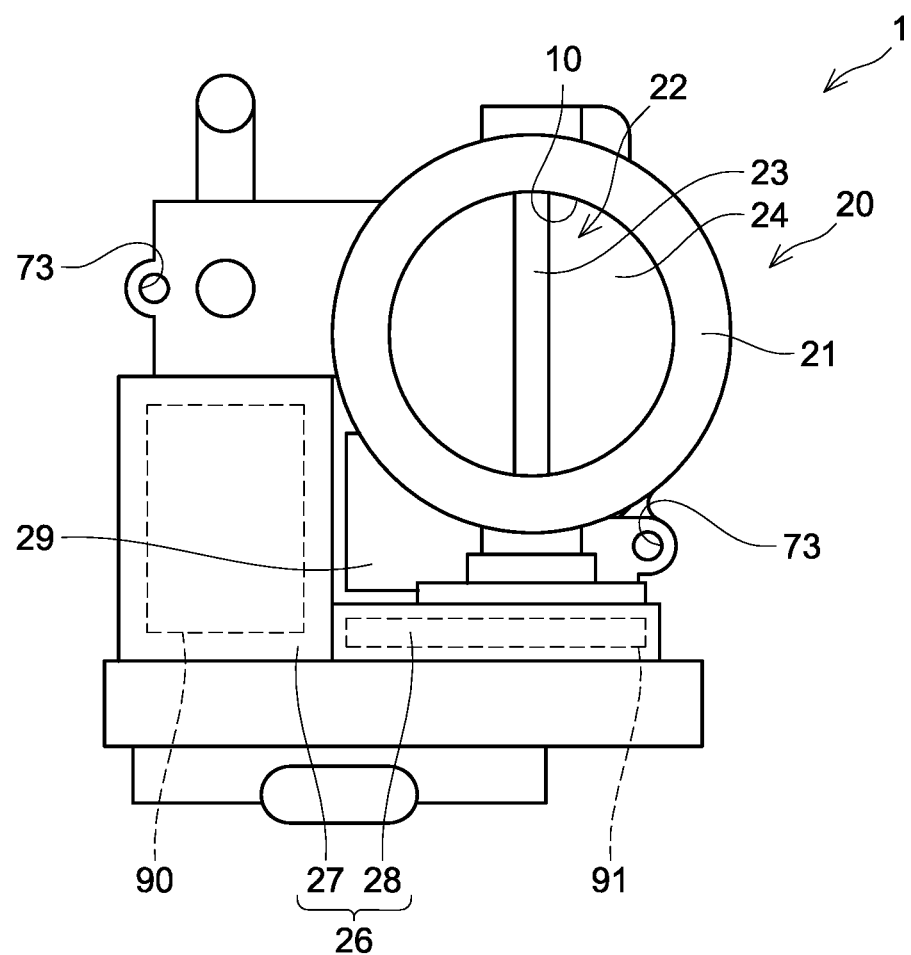
FIG. 7 is a plan view of a throttle body of the embodiment as seen from the intake duct side.

As shown in FIGS. 2 and 7, the throttle body 20 of the intake device 1 includes a bore unit 21, a throttle valve 22, and a housing unit 26. The throttle body 20 is constituted of, for example, resin or metal. The bore unit 21 constitutes a part of the intake passage 10. The air to be inducted into the engine 2 flows within the bore unit 21. The bore unit 21 has a substantially pipe shape and extends in the longitudinal direction of the intake passage 10.

The throttle valve 22 is for example a butterfly valve. The throttle valve 22 includes a rotary shaft 23 and a valve body 24. The rotary shaft 23 of the throttle valve 22 is rotatably provided with respect to the bore unit 21. The valve body 24 of the throttle valve 22 is disposed inside the bore unit 21 (intake passage 10). The valve body 24 is fixed to the rotary shaft 23 and is configured to rotate by the rotation of the rotary shaft 23. The intake passage 10 opens and closes by the rotation of the rotary shaft 23 and the valve body 24 of the throttle valve 22. When the throttle valve 22 enters an open state, the air is inducted into the engine 2 through the intake passage 10. When the throttle valve 22 enters a fully closed state, the air is no longer inducted into the engine 2. The throttle valve 22 is configured to control a flow rate of the air flowing in the intake passage 10.

The housing unit 26 is configured integrally with the bore unit 21. The housing unit 26 includes a motor unit 27 and a gear unit 28. A motor 90 is disposed in the motor unit 27 and a plurality of gears 91 is disposed in the gear unit 28. A hollow portion 29 is defined between the bore unit 21, the motor unit 27, and the gear unit 28. One of the spacers 50 is disposed in the hollow portion 29. Further, a plurality of holes 73 is defined in the housing unit 26. The holes 73 are defined respectively in the motor unit 27 and the gear unit 28 of the housing unit 26. Projections 72 of the intake manifold 40 to be described later are respectively inserted into the holes 73.

The motor 90 is for example a stepping motor or a DC motor. The motor 90 is connected to the throttle valve 22 via the gears 91. When the motor 90 rotates, the throttle valve 22 rotates via the gears 91. The motor 90 is configured to be rotatable in forward and reverse directions. For example, when the motor 90 rotates in the forward direction, the throttle valve 22 rotates in an opening direction, and when the motor 90 rotates in the reverse direction, the throttle valve 22 rotates in a closing direction. An operation of the motor 90 is controlled by an Engine Control Unit (ECU), for example.

Figure 8:
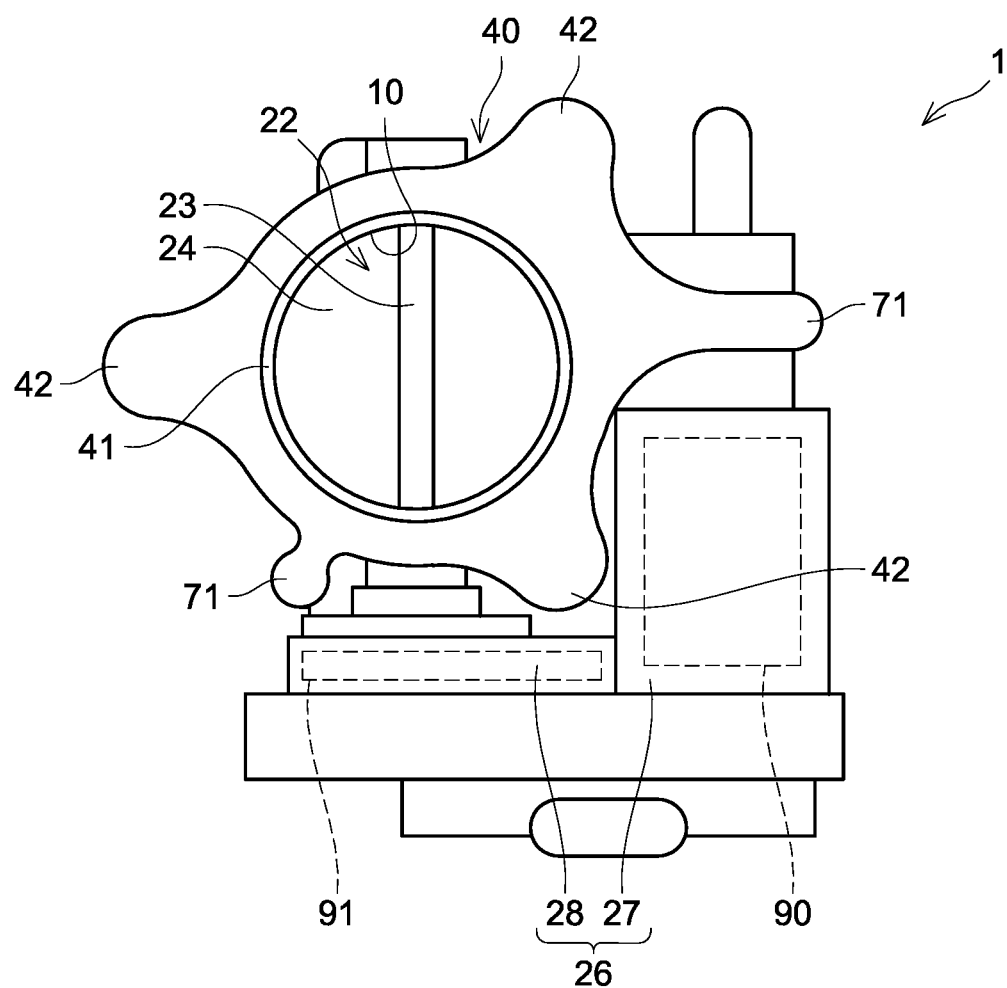
FIG. 8 is a plan view of the intake device of the embodiment as seen from an intake manifold side.
Figure 9:
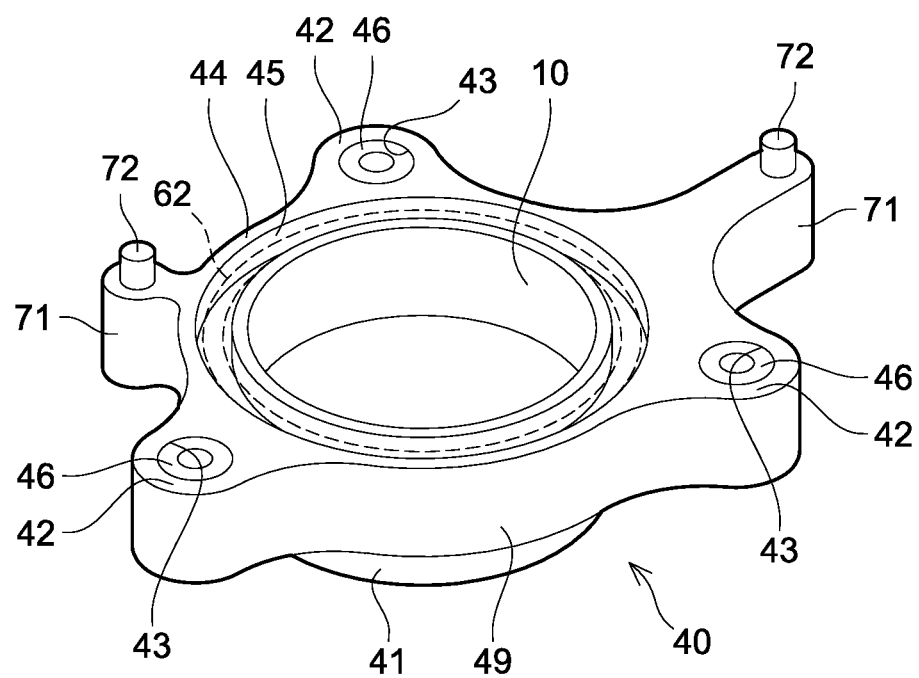
FIG. 9 is a perspective view of an intake manifold of the embodiment as seen from a throttle body side.

As shown in FIGS. 2, 8, and 9, the intake manifold 40 includes a manifold unit 41, a second annular flange 49 (an example of second flange), a plurality of second projecting flanges 42 (an example of second flange), and a plurality of third projecting flanges 71. The intake manifold 40 is constituted of, for example, resin or metal. The manifold unit 41 of the intake manifold 40 constitutes a part of the intake passage 10. The air to be inducted into the engine 2 flows within the manifold unit 41. The manifold unit 41 has a substantially pipe shape, and extends in the longitudinal direction of the intake passage 10. In the drawings, only a part of the manifold unit 41 is depicted.

The second annular flange 49 of the intake manifold 40 is fixed to an outer circumference of the manifold unit 41. The second annular flange 49 extends in a circumferential direction of the manifold unit 41. The second annular flange 49 projects out in directions perpendicular to the longitudinal direction of the intake passage 10. The second annular flange 49 projects outward from the manifold unit 41.

The plurality of second projecting flanges 42 and the plurality of third projecting flanges 71 of the intake manifold 40 are fixed to an outer circumference of the second annular flange 49. The plurality of second projecting flanges 42 is arranged in a spaced fashion along a circumferential direction of the second annular flange 49. Each of the second projecting flanges 42 projects outward in a direction perpendicular to the longitudinal direction of the intake passage 10. Each of the second projecting flanges 42 projects outward from the second annular flange 49. The plurality of second projecting flanges 42 and the second annular flange 49 are provided on an edge of the intake manifold 40 on a throttle body 20 side in the longitudinal direction of the intake passage 10.

An insertion hole 43 is defined in each of the plurality of second projecting flanges 42. Each of the insertion holes 43 has a round nut 46 inserted and fixed therein. The insertion holes 43 and the nuts 46 may be configured integrally by insert molding. Alternatively, the nuts 46 may be press-fitted in the insertion holes 43. Each of the nuts 46 is constituted of, for example, resin or metal. Each of the nuts 46 has a substantially cylindrical shape and extends in the same direction as the longitudinal direction of the intake passage 10. The bolts 60 are fastened in the nuts 46.

Projections 72 are respectively provided on the plurality of third projecting flanges 71. Each of the plurality of projections 72 projects toward the throttle body 20. Each of the projections 72 is inserted into corresponding one of the holes 73 defined in the housing unit 26 of the throttle body 20. By virtue of the respective projections 72 of the intake manifold 40 being inserted into the respective holes 73 of the throttle body 20, relative rotation between the throttle body 20 and the intake manifold 40 is restricted. A rotation restricting mechanism is configured by the projections 72 and the holes 73.

A groove 45 is defined in an end surface 44 of the intake manifold 40 on the throttle body 20 side. The groove 45 is configured in an annular shape. The groove 45 is defined around the manifold unit 41. An annular second gasket 62 is inserted in the groove 45 (in FIG. 9, the second gasket 62 is shown by broken lines). The second gasket 62 is disposed between the intake manifold 40 and the throttle body 20.

The intake device 1 of the embodiment has been described. As is apparent from the foregoing description, the intake device 1 includes the throttle body 20, the intake duct 30 disposed on one side of the throttle body 20, and the intake manifold 40 disposed on the other side of the throttle body 20. The intake duct 30 includes the plurality of first projecting flanges 32 projecting outward from the edge thereof on the throttle body 20 side. The intake manifold 40 includes the plurality of second projecting flanges 42 projecting outward from the edge thereof on the throttle body 20 side. The spacers 50 are each disposed between one of the plurality of first projecting flanges 32 and its corresponding one of the plurality of second projecting flanges 42 around the throttle body 20. Each of the plurality of first projecting flanges 32 of the intake duct 30 and the corresponding one of the plurality of second projecting flanges 42 of the intake manifold 40 are fastened via their corresponding one of the plurality of spacers 50 in the state where the throttle body 20 is held between the intake duct 30 and the intake manifold 40.

According to the above configuration, a distance between the intake duct 30 and the intake manifold 40 can be uniform by virtue of the plurality of spacers 50. Due to this, fastening force is applied uniformly over an entirety of the throttle body 20 held between the intake duct 30 and the intake manifold 40. Further, since the throttle body 20 does not have a portion fastened by a bolt, even when flatness of a surface of the intake manifold 40 on the throttle body 20 side is low, for example, this low flatness does not directly affect the throttle body 20. Due to this, distortion of the throttle body 20 can be mitigated.

In the above intake device 1, the plurality of first projecting flanges 32 and the plurality of second projecting flanges 42 are respectively fastened by their corresponding bolts 60. Large fastening force may be applied to the vicinities of bolts when the intake duct 30 and the intake manifold 40 are fastened by the bolts. However, according to the above configuration, since the fastening force is applied uniformly over the entirety of the throttle body 20 by virtue of presence of the plurality of spacers 50, the distortion of the throttle body 20 can be mitigated even in the case of fastening by the bolts 60. Further, since the throttle body 20 does not have a fastened portion, even when the flatness of the surface of the intake manifold 40 on the throttle body 20 side is low, for example, this low flatness does not directly affect the throttle body 20.

Further, in the above intake device 1, each of the plurality of spacers 50 includes the insertion hole 33 to which its corresponding bolt 60 is to be inserted. According to this configuration, the bolts 60 can easily be inserted in the spacers 50, and the intake duct 30 and the intake manifold 40 can smoothly be fastened by the bolts 60.

Further, in the above intake device 1, the first gasket 61 is disposed between the intake duct 30 and the throttle body 20. According to this configuration, airtightness between the intake duct 30 and the throttle body 20 can be increased. Due to this, both entry of external air into the intake passage 10 on an upstream side (intake duct 30 side) of the throttle body 20 and exit of the air from the intake passage 10 can both be prevented.

Further, the above intake device 1 includes the rotation restricting mechanism configured to restrict relative rotation between the throttle body 20 and the intake manifold 40. The rotation restricting mechanism includes the plurality of holes 73 defined in the throttle body 20 and the plurality of projections 72 projecting toward the throttle body 20 from the edge of the intake manifold 40 on the throttle body 20 side. The relative rotation between the throttle body 20 and the intake manifold 40 is restricted by the plurality of projections 72 being respectively inserted into the plurality of holes 73. According to this configuration, positional displacement between the throttle body 20 and the intake manifold 40 can be prevented. Further, upon assembling the throttle body 20 and the intake manifold 40, the alignment therebetween can be performed by simply inserting the plurality of projections 72 of the intake manifold 40 into the plurality of holes 73 of the throttle body 20.

Further, in the above intake device 1, the throttle body 20 is constituted of resin. When the throttle body 20 is constituted of resin, the throttle body 20 may easily distort, however, such distortion of the throttle body 20 can be mitigated by virtue of presence of the plurality of spacers 50. Further, since the throttle body 20 does not have a fastened portion, even when the flatness of the surface of the intake manifold 40 on the throttle body 20 side is low, for example, this low flatness does not directly affect the throttle body 20.

Further, in the above intake device 1, the hollow portion 29 is provided in the throttle body 20. One of the spacers 50 is disposed in the hollow portion 29. According to this configuration, weight of the throttle body 20 can be reduced by providing the hollow portion 29.

One embodiment has been described above, however, the specific configuration of the art disclosed herein is not limited to the above embodiment. In the description below, configurations similar to the configurations in the foregoing description will be given the same reference signs, and description thereof will be omitted.

Other Embodiments (1) In the above embodiment, the spacers 50 are fixed to the first projecting flanges 32 of the intake duct 30, however, in another embodiment, the spacers 50 may be separated from the first projecting flanges 32 of the intake duct 30. That is, the spacers 50 and the first projecting flanges 32 of the intake duct 30 may be configured as separate members. Further, in yet another embodiment, the spacers 50 may be fixed to the second projecting flanges 42 of the intake manifold 40.

(2) In the above embodiment, the nuts 46 are inserted in the insertion holes 43 defined in the second projecting flanges 42, however, in another embodiment, the nuts 46 may be omitted. In this case, internal threads may be defined in the insertion holes 43 of the second projecting flanges 42. The bolts 60 may be engaged with the internal threads of the insertion holes 43.

(3) In the above embodiment, the plurality of holes 73 is defined in the throttle body 20, and the plurality of projections 72 is provided on the intake manifold 40, however, in another embodiment, the plurality of projections 72 may be provided on the throttle body 20 and the plurality of holes 73 may be defined in the intake manifold 40. The relative rotation between the throttle body 20 and the intake manifold 40 may be restricted by the plurality of projections 72 of the throttle body 20 being inserted into the plurality of holes 73 of the intake manifold 40. Further, positions of the plurality of holes 73 or the plurality of projections 72 on the throttle body 20 are not particularly limited. Further, positions of the plurality of projections 72 or the plurality of holes 73 on the intake manifold 40 are not particularly limited.

(4) In another embodiment, the intake device 1 may include not only the rotation restricting mechanism configured to restrict the relative rotation between the throttle body 20 and the intake manifold 40 but also a second rotation restricting mechanism configured to restrict relative rotation between the throttle body 20 and the intake duct 30.

(5) In the above embodiments, the spacers 50 are provided between the first projecting flanges 32 of the intake duct 30 and the second projecting flanges 42 of the intake manifold 40, however, no limitation is made to this configuration. In another embodiment, for example, the spacer(s) 50 may be provided between the first annular flange 39 of the intake duct 30 and the second annular flange 49 of the intake manifold 40. In this case, the first projecting flanges 32 and the second projecting flanges 42 may be omitted.

Specific examples of the present invention have been described in detail, however, these are mere exemplary indications and thus do not limit the scope of the claims. The art described in the claims includes modifications and variations of the specific examples presented above. Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

REFERENCE SIGNS LIST

1: intake device
2: engine
10: intake passage
11: exhaust passage
20: throttle body
21: bore unit
22: throttle valve
23: rotary shaft
24: valve body
26: housing unit
27: motor unit
28: gear unit
29: hollow portion
30: intake duct
31: duct unit
32: first projecting flange
33: insertion hole
39: first annular flange
40: intake manifold unit
41: manifold unit
42: second projecting flange
43: insertion hole
46: nut
49: second annular flange
50: spacer
53: sleeve
60: bolt
61: first gasket
62: second gasket
71: third projecting flange
72: projection
73: hole
80: exhaust duct
90: motor
91: gear

The invention claimed is:

1. An intake device comprising:
a throttle body comprising a throttle valve;
an intake duct disposed on one side of the throttle body; and
an intake manifold disposed on the other side of the throttle body,
wherein
the intake duct comprises a first flange projecting outward from an edge of the intake duct on the throttle body side,
the intake manifold comprises a second flange projecting outward from an edge of the intake manifold on the throttle body side,
a plurality of spacers is disposed between the first flange and the second flange distributed around and spaced from the throttle body and is not in contact with the throttle body, and
the first flange and the second flange are fastened via the plurality of spacers in a state where the throttle body is held between the intake duct and the intake manifold.

2. The intake device according to claim 1, further comprising: a gasket disposed between the intake duct and the throttle body.

3. The intake device according to claim 1, wherein the throttle body is constituted of resin.

4. The intake device according to claim 1, wherein a hollow portion is provided in the throttle body, and at least one of the plurality of spacers is located in the hollow portion.

5. The intake device according to claim 1, wherein each of the spacers includes a respective insertion hole in which a respective bolt is inserted, and wherein the first flange and the second flange are fastened via the plurality of spacers by the respective bolt inserted in the respective insertion hole of each of the spacers.

6. The intake device according to claim 5, wherein each said insertion hole has a respective sleeve inserted therein, and wherein the respective bolt inserted in each insertion hole is inserted in the sleeve of the insertion hole.

7. The intake device according to claim 1, wherein each of the spacers has a substantially cylindrical shape.

8. The intake device according to claim 1, wherein each of the spacers is configured as a separate member with respect to each other and with respect to the throttle body.

9. The intake device according to claim 1, wherein each of the spacers comprises a substantially cylindrical outer surface free of contact with respect to each other and with respect to the throttle body.

10. The intake device according to claim 9, wherein the substantially cylindrical outer surface of each spacer is free of contact.

11. The intake device according to claim 9, wherein the substantially cylindrical outer surface of each spacer is surrounded by a clearance.

12. The intake device according to claim 9, wherein:
    each of the spacers extends longitudinally between the intake duct and intake manifold; and
    each of the spacers comprises a first end surface abutting the intake duct and a second end surface abutting the intake manifold.

13. The intake device according to claim 12, wherein the substantially cylindrical outer surface extends longitudinally from the first end surface to the second end surface.

\* \* \* \* \*